E. K. BAKER.
DEMOUNTABLE RIM CONSTRUCTION.
APPLICATION FILED JULY 3, 1919.
1,368,419.
Patented Feb. 15, 1921.
3 SHEETS—SHEET 1.
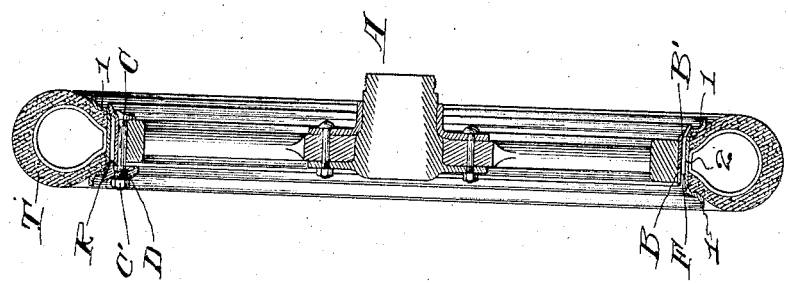
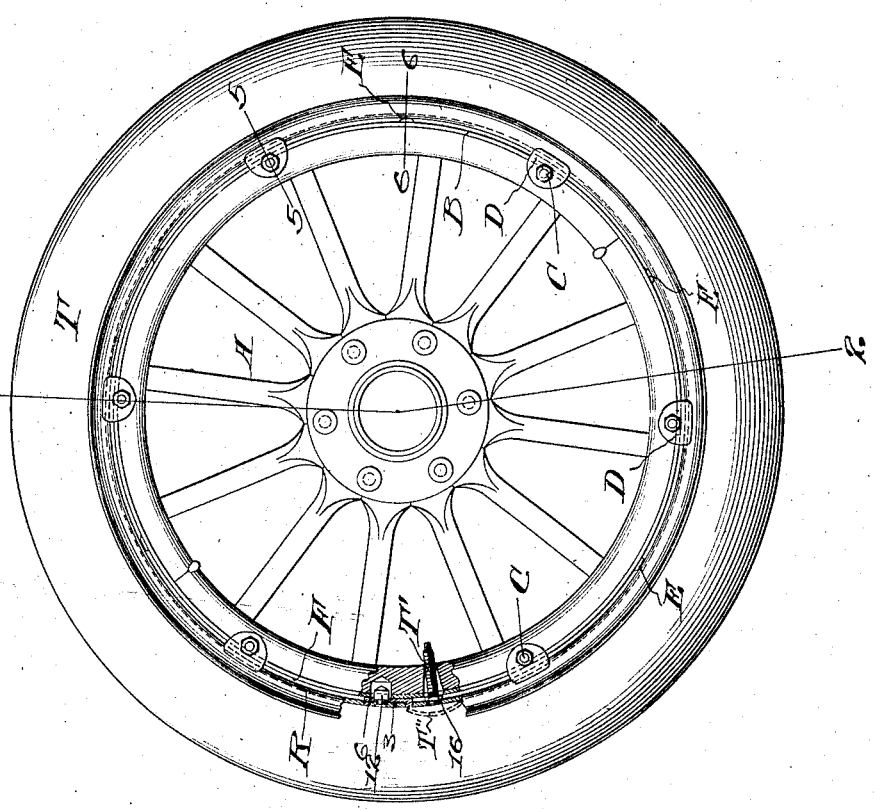
Witness:
Earl E. Jones
Inventor:
Eric K. Baker
By: [signature] Atty.

E. K. BAKER.
DEMOUNTABLE RIM CONSTRUCTION.
APPLICATION FILED JULY 3, 1919.
1,368,419.
Patented Feb. 15, 1921.
3 SHEETS—SHEET 2.
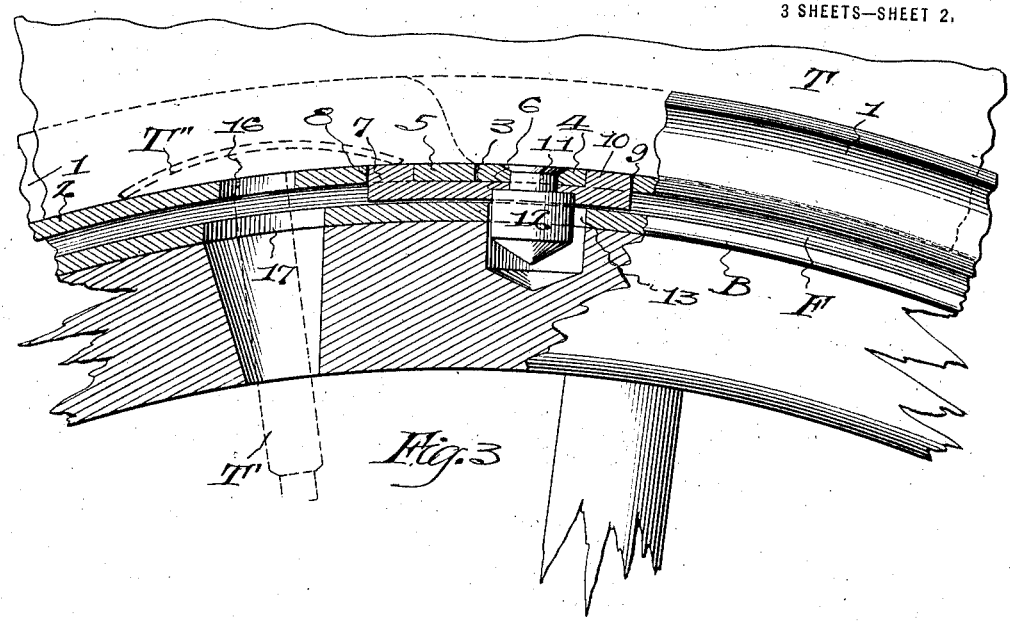
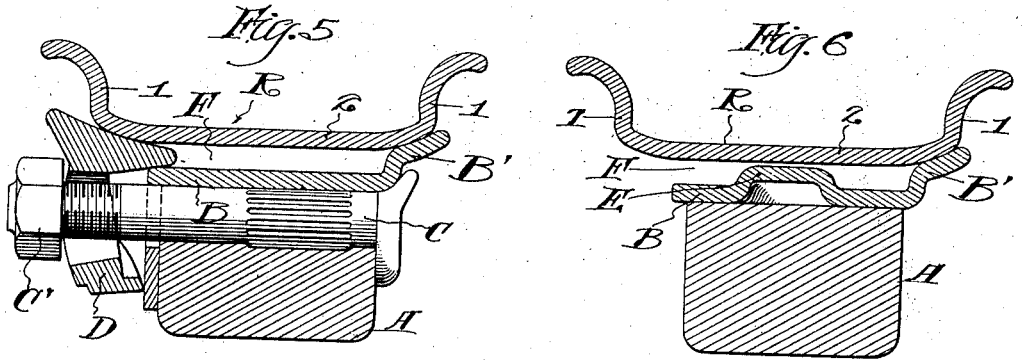
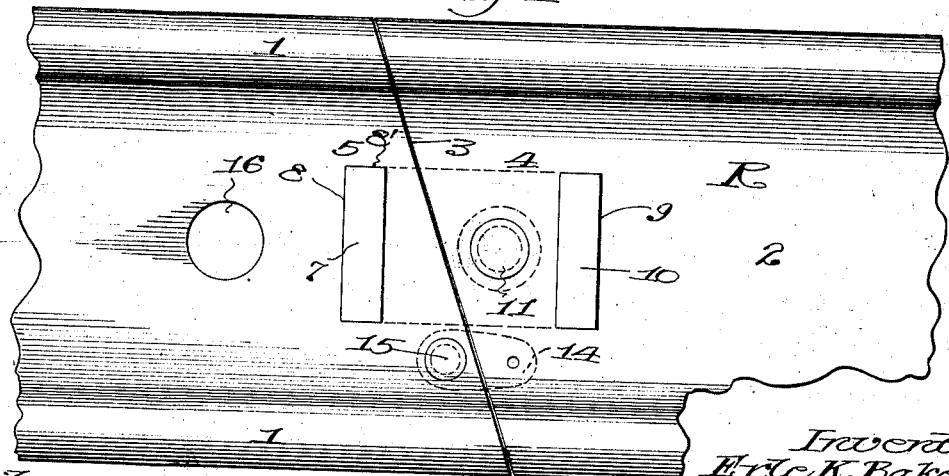
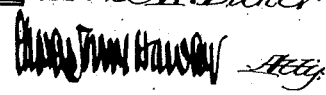

E. K. BAKER.
DEMOUNTABLE RIM CONSTRUCTION.
APPLICATION FILED JULY 3, 1919.
1,368,419.
Patented Feb. 15, 1921.
3 SHEETS—SHEET 3.
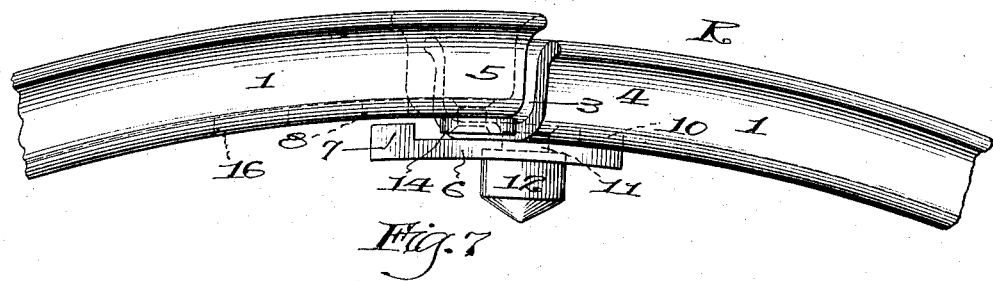
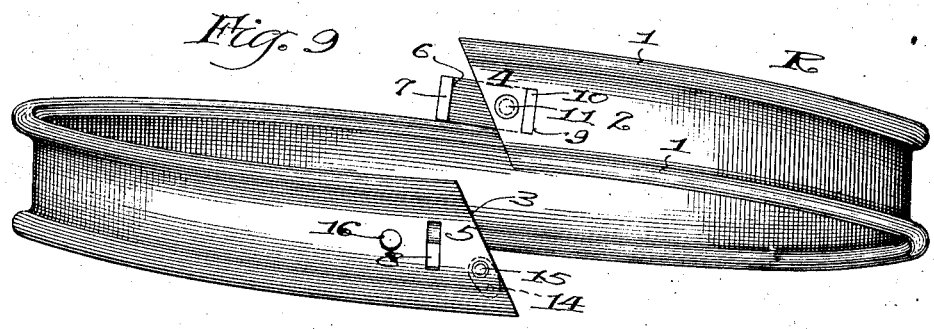
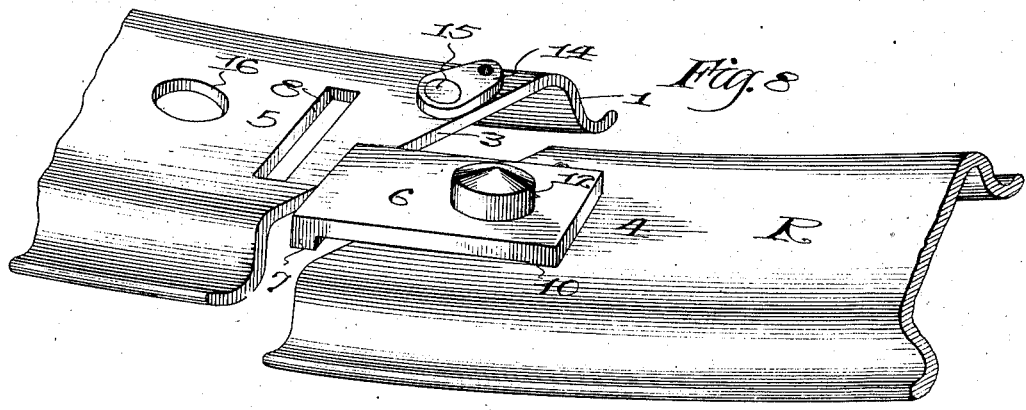

UNITED STATES PATENT OFFICE.

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE-RIM CONSTRUCTION.

1,368,419.  Specification of Letters Patent.  Patented Feb. 15, 1921.

Application filed July 3, 1919. Serial No. 308,489.

*To all whom it may concern:*

Be it known that I, ERLE K. BAKER, a citizen of the United States, and a resident of Chicago, Cook county, Illinois, have invented a certain new and Improved Demountable-Rim Construction, of which the following is a specification.

My invention relates to demountable rim construction for automobile wheels; and this present case is a continuation in part of my application, Serial No. 216,172, filed February 9, 1918, abandoned in favor of this application.

The object of my invention is to improve the construction of pneumatic tire carrying rims for automobile wheels; to provide a construction whereof the rim shall be of the bolted-on type, and readily removable or demountable from the wheel by the usual "buttoning on" and off action; and in which the rim in itself, while adapted firmly and safely to hold an inflated tire, both with and without the assistance of the wheel shall be so constructed as to enable its removal from one tire and its replacement in another with a minimum number of operations and with the greatest possible ease and safety; and without the use of the special tools frequently used for expanding and contracting such rims.

A further object of the invention is to provide a demountable rim which shall be composed of a single piece in the sense that it shall have no parts that are separable from it and likely to be lost.

Another object of the invention is to provide a rim-end connecting and driving device of great strength and reliability though of low cost which shall be specially and peculiarly suited to a demountable rim which is transplit upon a diagonal or oblique line.

I attain all these and other incidental objects in the demountable rim construction hereinafter described and claimed. The details of the invention in its best form will be readily understood on reference to the drawings accompanying this specification; wherein: Figure 1 depicts an automobile wheel and tire equipped with a demountable rim construction embodying my invention; Fig. 2 is a section on the line 2—2 of Fig. 1;—Fig. 3 is an enlarged sectional view of the meeting ends of the demountable transplit rim and the rim-end connecting and driving parts thereon;—Fig. 4 is a plan view thereof;—Fig. 5 is an enlarged cross-section of the rim and wheel felly on the line 5—5 of Fig. 1;—Fig. 6 is a like cross section on the line 6—6 of Fig. 1;—Fig. 7 shows the rim ends in partially separated condition;—Fig. 8 is a perspective view of the same rim ends inverted; that is, viewed from the inner side of the rim; and Fig. 9 shows the complete demountable rim in helically distorted condition; in other words, with the rim ends laterally separated, as when the rim is being placed in or taken from a pneumatic tire.

The automobile wheel, A, is characterized by a fixed rim, B, having a suitable conical back flange, B'. The wheel is also characterized by a plurality of circumferentially spaced rim clamping bolts, C, which, at the back, draw against the fixed rim, B. These bolts are adjacent the inner periphery of the fixed rim and on their outer ends carry the clamping lugs, D, usually of wedge form and secured by the heads or nuts, C', on respective bolts, C. Further than this the fixed rim is characterized by intermediate rim supporting and centering studs or embossments, E, such as I have previously made familiar in the art.

The demountable rim, R, hereinafter described in detail, is secured upon the wheel through being clamped between the fixed rim flange, B', and the clamping lugs, D. As shown, an annular space, F, remains between the fixed rim, B, and the demountable rim, R, which looseness permits the rim to be "buttoned on" and "unbottoned" from the wheel in the usual manner. The pneumatic tire, T, is carried by the demountable rim, R, and T' represents the valve stem of the tire. As hereinafter shown, the "unbottoning" movement of the rim takes place from a hinge point formed by the valve stem of the tire and the driving member of the demountable rim.

My novel demountable rim, R, is made from a single strip of metal hooped up, that is, turned to the form of a ring and either coincidentally or afterward expanded outward at the edges to form the integral side flanges, 2, the form of which is determined by the shape of the pneumatic tire to be carried by the rim. As here shown, the rim is of the straight-side type, being provided with side flanges, 1, 1, which start outward in planes substantially perpendicular to the middle or base portion, 2, of the rim and then flare outwardly. The shape of the rim in cross section is shown in Figs. 5 and 6, such being the best form for a so-called straight-side pneumatic tire, T. Incidentally, Fig. 5 clearly discloses the relations of the parts B, B', R, D, and C, and Fig. 6 is a good showing of a centering stud, E. It will be obvious that the diameter of the rim, R, is determined by the inside diameter of the tire, T, and that the fixed rim, B, must needs present its back flange (whatever its form) in the illustrated relation to the rim R.

The circular rim, R, is not a complete ring; instead, it is transplit at one point, that is, it is opened or transversely cut across at one point. And the cut or split (see 3, in Fig. 4) is not perpendicular to the side flanges of the rim, but conforms to a diagonal or oblique line beginning at one flange, 1, and extending across the rim to a circumferentially advanced point in the opposite flange, 1. Thus the rim ends, marked 4 and 5, take the form best depicted in Figs. 4 and 9; and readily may be drawn or forced apart laterally as shown in Fig. 9. Such lateral separation of the ends 4 and 5 permits them to collapse one upon the other while within a tire and thereby the rim is reduced in circumference sufficiently to enable the flanges, 1, 1, of one of the rim ends to be freed from the base beads of the tire, whereupon the whole rim may be drawn from the tire by an easy, progressive helical motion of the rim within the tire. The replacement of the rim within the same or another pneumatic tire is accomplished in reverse order, the beveled or relatively overlapping rim ends 4 and 5 greatly facilitating the operation. Indeed a rim thus transplit upon a diagonal line may be put into a tire without the aid of any tool.

At the moment of the complete lodgment of the rim within the tire, the rim ends 4 and 5 are found in alinement. After the rim is thus lodged within the tire, it becomes necessary to secure the rim ends firmly in proper alinement, lest they be displaced one upon the other (obviously one rim end may slide diagonally upon the other) by the compressive force of the tire when the latter is inflated; and further it is necessary to secure the rim ends against being pulled apart, circumferentially, for when the rim, carrying its tire, is clamped upon the wheel the wedge lugs, D, and the conical or beveled back flange, B', exert forces tending to expand or circumferentially enlarge the rim; even when resisted by the compressive force of the inflated tire; and more especially at moments when the tire is deflated as by a puncture or blow-out. For thus securing the rim ends in alinement, and at the same time fastening them together against circumferential separation, I provide the rim end, 4, with a member, 6, which presents a hook-like end, 7; and in the rim end, 5, I provide a transverse rectangular slot, 8, adapted to receive the hook, 7. The springiness of the rim permits the hook to pass beneath the end, 5, and drop into the slot, 8. As hereinafter explained, the member, 6, is rigidly secured on the rim end, 4, and when thus engaged in the slot, 8, it effectively alines the rim ends, 4 and 5, and securely ties them together.

On reference to Figs. 3, 4, and 9, it will be seen that the rim end, 4, contains a like slot or opening, 9, symmetrical with the slot, 8, in the opposite rim end, but set farther back from the split, 3. The member 6, as best shown in Figs. 3 and 7, is a circumferentially curved plate having an outstanding rib, on each end. One of these ribs is the hook, 7, before mentioned and the other is identical with it; comprising the hook, 10, which latter completely fills the rectangular hole or slot, 9, in the rim end, 4, and may be swaged or otherwise secured therein. Thus the rigidity of the member, 6, with respect to the rim, 4, is amply insured. The plate or member, 6, having the hooks, 7, and 9, is not relatively thin and as shown in Fig. 3 does not quite fill the annular opening or space, F, between the rim, R, and the rim, B. It is accommodated in that space when the rim is placed on the wheel as shown in Figs. 1 and 3.

During ordinarily frequent tire-changing operations, the member, 6, constituting the rim-end connector, may be subjected to considerable strain due to the ignorance or awkwardness of the user; and I do not rely upon the hook, 10, as the only means for fastening it to the rim end, 4, but instead securely fasten it by means of a powerful rivet, 11, which passes through the rim end, 4, and through the body or intermediate part of the member or connector, 6. This construction is best illustrated in Fig. 3, wherein also it will be seen that the rivet, 11, has a large head, 12. Both heads of the rivet are deeply counter-sunk in respective parts, 4 and 6, and thereby an extremely strong attachment is completed between the body of the rim and the rim-end connector, 6. A hole, 13, is made in the fixed rim, B, adjacent one of the spokes of the wheel and this hole accommodates the large head, 12, of the rivet, 11, when the rim is placed on the wheel. Thus I complete a strong driving engagement between the rim and the wheel, which engagement prevents circumferential creeping of the rim on the wheel. Because of this function the part 12, will be referred to as a rim driver.

It should be noted that as the parts 4 and 6 are effectively interlocked by the integral hook, 10, in the slot, 9, the connector, 6, cannot move circumferentially on the rim end. The rivet, 11, passes through both parts, being thereby provided with a long shank; and as the parts 4 and 6 are rigid with respect to both circumferential and transverse relative movement, no amount of driving force between the rim and the wheel, against the part 12, can by any possibility dislodge or distort that driving part.

As will be at once apparent, when the rim-end connector is in engaged condition it serves to hold the rim ends against separation in one radial direction. I complete this radial interlockment of the rim ends by means of a small turn-button, 14, pivoted as by a rivet, 15, on the rim end, 5. When in locked condition, the member, 6, attached to the end, 4, rigidly engages the underside of the end, 5, while the turn-button on the end 5 engages the under side of the end, 4. Although both of the locking parts are on the inner periphery of the rim and do not themselves engage, nevertheless the rim ends are successfully interlocked; each rim end being radially restrained in both directions. The safety lock thus established is particularly advantageous when the rim is being carried as a spare with an inflated tire thereon, at which time the wheel is not present to prevent one end of the rim from slipping beneath the other by the collapsing pressure of the tire. In the past, accidents of this kind have been accompanied by serious results, showing the importance of the structure here described.

The hole, 16, for the valve stem, T', of the tire is positioned closely adjacent the slot, 8, in the rim end, 5, as shown in Figs. 1 and 3. A corresponding valve stem hole, 17, is provided in the fixed rim and felly, closely adjacent the driver hole, 13, therein. This location of the valve stem hole, 16, is particularly advantageous for two reasons: First, the valve stem spreader, T'' (shown in dotted lines Fig. 3) interposed between the rim R and the inner tube of the tire, may conveniently cover and protect the slot, 8, which cannot be entirely filled by the hook, 7, lest the latter be difficult to disengage. Second, the location of the valve gage, T', close to the driver, 12, permits them to be placed in the holes, 17 and 13, when placing the rim on the wheel, and in such position these parts complete a temporary hinge between the rim and the wheel and greatly facilitate the buttoning and unbuttoning or mounting and demounting of the rim.

Attention is called to the relation of the slots 8 and 9, (particularly the slot 8) to the center line and side flanges of the rm. The slot, 8, is perpendicular thereto, and this relation markedly facilitates the first and the last lateral movement of the rim ends in opening and closing the rim. At such times the hook, 7, when disengaged from the side, 8', of the slot, 8, slides freely under the restraint of the long end walls of the slot, 8. The rim ends do not actually meet or bear one on the other but are separated by a slit, 3, of appreciable, though slight, width. During such movements of the hook, 7, under the restraint in the walls of the slot, 8, the ends of the rim may slightly approach one another, the normal width of the slit or split, 3, permitting such movement. By preserving the direct perpendicular abutting relation between the rim end, 5, and the hook, 7, the parts are placed in the best possible condition to resist both the collapsing pressure of the tire and the expanding force of the clamping devices on the wheel.

It will now be apparent that in this demountable rim construction, I have attained all of the objects initially set forth herein; and have provided a rim which is safe and reliable under all conditions of use; which is easy and safe to operate; which is of less cost than any of the demountable rims that have preceded it in the art; and for which no repair parts need be provided.

Having thus described my invention, I claim as new and desire to secure by Letters Patent:—

1. A one-piece integrally flanged demountable rim, presenting at one point a diagonal split which forms complementary rim ends 4 and 5, said ends containing slots 9 and 8 respectively, in combination with a rectangular rim-end connector comprising a plate 6 applied to the inner periphery of the rim, bridging the split therein and having hooks or ribs 10 and 7 entering respective slots 9 and 8, means assisting the hook 10 in securing said connector to the rim end 4, and a turn button 15 pivoted on the rim end 5, for engagement with the rim-end 4.

2. A one-piece integrally flanged demountable rim, presenting at one point a diagonal split which forms complementary rim ends 4 and 5, said ends containing slots 9 and 8 respectively, in combination with a rectangular rim end connector comprising a plate 6 applied to the inner periphery of the rim, bridging the split therein and having hooks or ribs 10 and 7 entering respective slots 9 and 8, a rivet 11 assisting the hook 10 in securing said connector to the rim end 4, and presenting an enlarged inner head 12 which forms a rim driver, and a turn button 14 on the rim end 5, for engagement with the rim-end 4.

In testimony whereof I have hereunto set my hand this 23d day of June, 1919.

ERLE KING BAKER.